United States Patent
Tsutsui et al.

(10) Patent No.: US 8,979,706 B2
(45) Date of Patent: Mar. 17, 2015

(54) CONTROL DEVICE AND CONTROL METHOD FOR LOCKUP CLUTCH

(71) Applicant: Aisin AW Co., Ltd., Anjo-shi, Aichi-ken (JP)

(72) Inventors: Hiroshi Tsutsui, Nishio (JP); Makoto Hashizume, Takai (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 14/239,674

(22) PCT Filed: Oct. 29, 2012

(86) PCT No.: PCT/JP2012/077882
§ 371 (c)(1),
(2) Date: Feb. 19, 2014

(87) PCT Pub. No.: WO2013/065635
PCT Pub. Date: May 10, 2013

(65) Prior Publication Data
US 2014/0209425 A1    Jul. 31, 2014

(30) Foreign Application Priority Data
Nov. 4, 2011  (JP) .................................. 2011-242901

(51) Int. Cl.
*B60W 10/00*  (2006.01)
*F16H 61/14*  (2006.01)
*F16D 43/20*  (2006.01)
*F16D 43/25*  (2006.01)

(52) U.S. Cl.
CPC ................ *F16H 61/14* (2013.01); *F16D 43/20* (2013.01); *F16D 43/25* (2013.01)

USPC ............................................................ 477/76

(58) Field of Classification Search
USPC .......... 477/62, 76, 77, 83, 166, 174, 176, 180
See application file for complete search history.

(56) References Cited

U.S. PATENT DOCUMENTS

| 4,502,579 A * | 3/1985 | Makita ............................. 701/67 |
| 4,914,982 A * | 4/1990 | Ito et al. ........................... 477/62 |
| 6,062,358 A * | 5/2000 | Otto et al. ..................... 192/3.29 |
| 8,439,799 B1 * | 5/2013 | Muto et al. ....................... 477/76 |

(Continued)

FOREIGN PATENT DOCUMENTS

| JP | A-2009-243533 | 10/2009 |
| JP | A-2010-286008 | 12/2010 |
| JP | A-2011-247285 | 12/2011 |

OTHER PUBLICATIONS

International Search Report issued in International Patent Application No. PCT/JP2012/077882 dated Jan. 29, 2013.

*Primary Examiner* — Justin Holmes
(74) *Attorney, Agent, or Firm* — Oliff PLC

(57) ABSTRACT

A control device for a lockup clutch of a vehicle. A slip control device executes slip control to make a rotational speed difference between the input member and the input shaft match a target slip speed according to a state of the vehicle by half engagement of the lockup clutch. A clutch temperature obtaining means obtains a clutch temperature of the lockup clutch. A determining means determines if the lockup clutch should be fully engaged or disengaged based on at least a state of the motor if the clutch temperature becomes equal to or higher than a predetermined temperature during execution of the slip control. A slip control stop means for stopping the slip control by fully engaging or disengaging the lockup clutch according to the determination result of the determining means.

4 Claims, 4 Drawing Sheets

(56) References Cited

U.S. PATENT DOCUMENTS 8,682,554 B2 * 3/2014 Takamatsu et al. ............. 701/68
2007/0243971 A1 * 10/2007 Brevick .......................... 477/70
2009/0248266 A1 10/2009 Oue et al.
2010/0312444 A1 12/2010 Takamatsu et al.

* cited by examiner

CONTROL DEVICE AND CONTROL METHOD FOR LOCKUP CLUTCH

TECHNICAL FIELD

The present invention relates to control devices and control methods for lockup clutches capable of coupling an input member connected to a motor of a vehicle and an input shaft of a transmission device and decoupling the input member and the input shaft.

BACKGROUND ART

Conventionally, a control device that prohibits slip control of a torque converter via slip engagement of a lockup clutch during a period from the time an estimate of a clutch facing temperature becomes equal to or higher than a slip control prohibition temperature to the time when the estimate of the clutch facing temperature becomes equal to or lower than a slip control permission temperature in order to prevent overheat is known as this type of control device for a lockup clutch (see, e.g., Patent Document 1). While the slip control is being prohibited, this control device causes the torque converter to function in a lockup state where front-rear differential rotation, namely a slip rotational speed, of the lockup clutch has a value of 0. This control device thus suppresses reduction in durability of the lockup clutch due to early wear of clutch facing.

RELATED ART DOCUMENT

Patent Document

[Patent Document 1] Japanese Patent Application Publication No. 2009-243533 (JP 2009-243533 A)

SUMMARY OF THE INVENTION

However, if lockup (full engagement of the lockup clutch) is consistently performed during execution of the slip control in order to protect the lockup clutch as in the conventional control device for the lockup clutch, an occupant of a vehicle may feel uncomfortable due to rotation fluctuations, change in noise, vibrations, etc. which are associated with the lockup. Even if the lockup clutch is consistently disengaged during execution of the slip control in order to protect the lockup clutch, the occupant of the vehicle may similarly feel uncomfortable due to rotation fluctuations, vibrations, noise, etc. of a motor which are associated with the disengagement of the lockup clutch.

It is a primary object of the present invention to more properly stop slip control in order to protect a lockup clutch.

A control device and a control method for a lockup clutch according to the present invention use the following means in order to achieve the above primary object.

A control device for a lockup clutch according to the present invention is a control device for a lockup clutch capable of coupling an input member connected to a motor of a vehicle and an input shaft of a transmission device and decoupling the input member and the input shaft, characterized by including: slip control means for executing slip control to make a rotational speed difference between the input member and the input shaft match a target slip speed according to a state of the vehicle by half engagement of the lockup clutch; clutch temperature obtaining means for obtaining a clutch temperature of the lockup clutch; determining means for determining if the lockup clutch should be fully engaged or disengaged based on at least a state of the motor if the clutch temperature becomes equal to or higher than a predetermined temperature during execution of the slip control; and slip control stop means for stopping the slip control by fully engaging or disengaging the lockup clutch according to the determination result of the determining means.

This control device for the lockup clutch determines whether to fully engage or disengage the lockup clutch according to at least the state of the motor if the clutch temperature becomes equal to or higher than the predetermined temperature during execution of the slip control. Thus, when the slip control is stopped to protect the lockup clutch, one of full engagement and disengagement of the lockup clutch which can more satisfactorily suppress manifestation of, e.g., rotation fluctuations, change in noise, vibrations, etc. of the motor can be selected according to at least the state of the motor. This can reduce the possibility of making an occupant of the vehicle feel uncomfortable by stopping of the slip control. According to this control device for the lockup clutch, the slip control can therefore be more properly stopped to protect the lockup clutch.

The determining means may determine if the lockup clutch should be fully engaged or disengaged based on at least one of input torque that is transferred from the motor to the input member and a rotational speed of the motor.

The determining means may determine that the lockup clutch should be fully engaged if the input torque is larger than predetermined torque or the rotational speed of the motor is higher than a predetermined rotational speed, and may determine that the lockup clutch should be disengaged if the input torque is equal to or smaller than the predetermined torque and the rotational speed of the motor is equal to or lower than the predetermined rotational speed. Whether the lockup clutch should be fully engaged or disengaged can thus be more properly determined.

The slip control stop means may stop the slip control by disengaging the lockup clutch in an inertia phase of shifting, if there are a torque request to the motor and a request for the shifting of the transmission device. That is, in the inertia phase of the shifting, rotation of the motor or the input shaft of the transmission device fluctuates regardless of the engagement state of the lockup clutch. Accordingly, disengaging the lockup clutch in the inertia phase can suppress manifestation of rotation fluctuations, change in noise, vibrations, etc. which are associated with the disengagement of the lockup clutch.

The slip control stop means may stop the slip control by immediately disengaging the lockup clutch, if there is no torque request to the motor. That is, if there is no torque request to the motor, the rotational speed of the motor or the input shaft of the transmission device decreases, and manifestation of rotation fluctuations, change in noise, vibrations, etc. which are associated with the disengagement of the lockup clutch is therefore less likely to occur. Immediately disengaging the lockup clutch can thus satisfactorily protect the lockup clutch.

The slip control stop means may stop the slip control by fully engaging the lockup clutch if the input torque is larger than the predetermined torque or the rotational speed of the input shaft is higher than a predetermined rotational speed, and may stop the slip control by disengaging the lockup clutch if the input torque is equal to or smaller than the predetermined torque and the rotational speed of the input shaft is equal to or lower than the predetermined rotational speed. Thus, when the lockup clutch should be protected, the slip control can be stopped by performing more preferable one of full engagement and disengagement of the lockup clutch.

A control method for a lockup clutch according to the present invention is a control method for a lockup clutch capable of coupling an input member connected to a motor of a vehicle and an input shaft of a transmission device and decoupling the input member and the input shaft, including the steps of: (a) executing slip control to make a rotational speed difference between the input member and the input shaft match a target slip speed according to a state of the vehicle by half engagement of the lockup clutch; (b) determining if the lockup clutch should be fully engaged or disengaged based on at least a state of the motor if a clutch temperature becomes equal to or higher than a predetermined temperature during execution of the slip control; and (c) stopping the slip control by fully engaging or disengaging the lockup clutch according to the determination result in step (b).

According to this method, when the slip control is stopped to protect the lockup clutch, one of full engagement and disengagement of the lockup clutch which can more satisfactorily suppress manifestation of, e.g., rotation fluctuations, change in noise, vibrations, etc. of the motor can be selected according to at least the state of the motor. This can reduce the possibility of making an occupant of the vehicle feel uncomfortable by stopping of the slip control. The slip control can therefore be more properly stopped to protect the lockup clutch.

MODES FOR CARRYING OUT THE INVENTION

A mode for carrying out the present invention will be described based on an embodiment.

Figure 1:
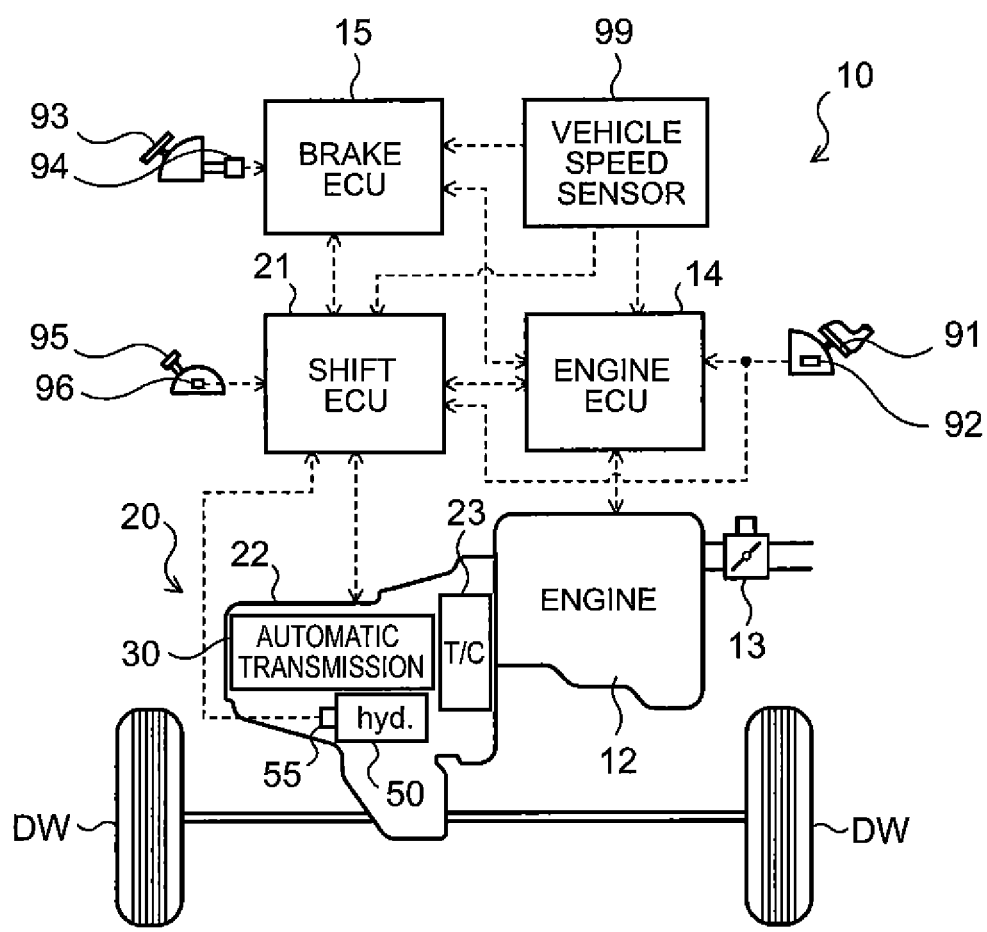
FIG. 1 is a schematic configuration diagram of an automobile 10 as a vehicle including a control device for a lockup clutch according to the present invention.

FIG. 1 is a schematic configuration diagram of an automobile 10 as a vehicle including a control device for a lockup clutch according to the present invention. The automobile 10 shown in the figure includes an engine (internal combustion engine) 12 as a motor that outputs power by explosive combustion of a mixture of air and hydrocarbon-based fuel such as gasoline or light oil, an engine electronic control unit (hereinafter referred to as the "engine ECU") 14 that controls the engine 12, a brake electronic control unit (hereinafter referred to as the "brake ECU") 15 that controls an electronically controlled hydraulic brake unit, not shown, a power transmission device 20 that is connected to the engine 12 and transmits power from the engine 12 to right and left drive wheels DW, etc. The power transmission device 20 has a transmission case 22, a hydraulic transmission device 23, a stepped automatic transmission 30, a hydraulic control device 50, a shift electronic control unit (hereinafter referred to as the "shift ECU") 21 that controls these components, etc.

The engine ECU 14 is configured as a microcomputer having a CPU, not shown, as a core, and has a ROM that stores various programs, a RAM that temporarily stores data, an input/output port and a communication port (both not shown), etc. in addition to the CPU. As shown in FIG. 1, the engine ECU 14 receives an accelerator operation amount Acc from an accelerator pedal position sensor 92 that detects the amount by which an accelerator pedal 91 is stepped on (the amount by which the accelerator pedal 91 is operated), a vehicle speed V from a vehicle speed sensor 99, signals from various sensors etc. such as a crankshaft position sensor, not shown, that detects the rotation position of a crankshaft, signals from the brake ECU 15 and the shift ECU 21, etc. Based on these signals, the engine ECU 14 controls an electronically controlled throttle valve 13, a fuel injection valve and an ignition plug, which are not shown, etc. The engine ECU 14 calculates a rotational speed Ne of the engine 12 based on the rotation position of the crankshaft which is detected by the crankshaft position sensor, and calculates engine torque Te as an estimate of torque being output from the engine 12 based on, e.g., the rotational speed Ne, the intake air amount of the engine 12 which is detected by an airflow meter, not shown, or a throttle opening THR of the throttle valve 13, and a predetermined map or calculation expression.

The brake ECU 15 is also configured as a microcomputer having a CPU, not shown, as a core, and has a ROM that stores various programs, a RAM that temporarily stores data, an input/output port and a communication port (both not shown), etc. in addition to the CPU. As shown in FIG. 1, the brake ECU 15 receives a master cylinder pressure that is detected by a master cylinder pressure sensor 94 when a brake pedal 93 is stepped on, the vehicle speed V from the vehicle speed sensor 99, signals from various sensors etc., not shown, signals from the engine ECU 14 and the shift ECU 21, etc. The brake ECU 15 controls a brake actuator (hydraulic actuator) etc., not shown, based on these signals.

The shift ECU 21 is also configured as a microcomputer having a CPU, not shown, as a core, and includes a ROM that stores various programs, a RAM that temporarily stores data, an input/output port and a communication port (both not shown), etc. in addition to the CPU. As shown in FIG. 1, the shift ECU 21 receives the accelerator operation amount Acc from the accelerator pedal position sensor 92, the vehicle speed V from the vehicle speed sensor 99, a shift range SR from a shift range sensor 96 that detects the operation position of a shift lever 95 selecting a desired one of a plurality of shift ranges, signals from various sensors etc. such as an oil temperature sensor 55 that detects a temperature Toil of hydraulic oil of the hydraulic control device 50 and a rotational speed sensor 33 (see FIG. 2) that detects an input rotational speed (rotational speed of a turbine runner 25 or an input shaft 31 of the automatic transmission 30) Ni of the automatic transmission 30, signals from the engine ECU 14 and the brake ECU 15, etc. The shift ECU 21 controls the hydraulic transmission device 23 and the automatic transmission 30, and the hydraulic control device 50, based on these signals.

Figure 2:
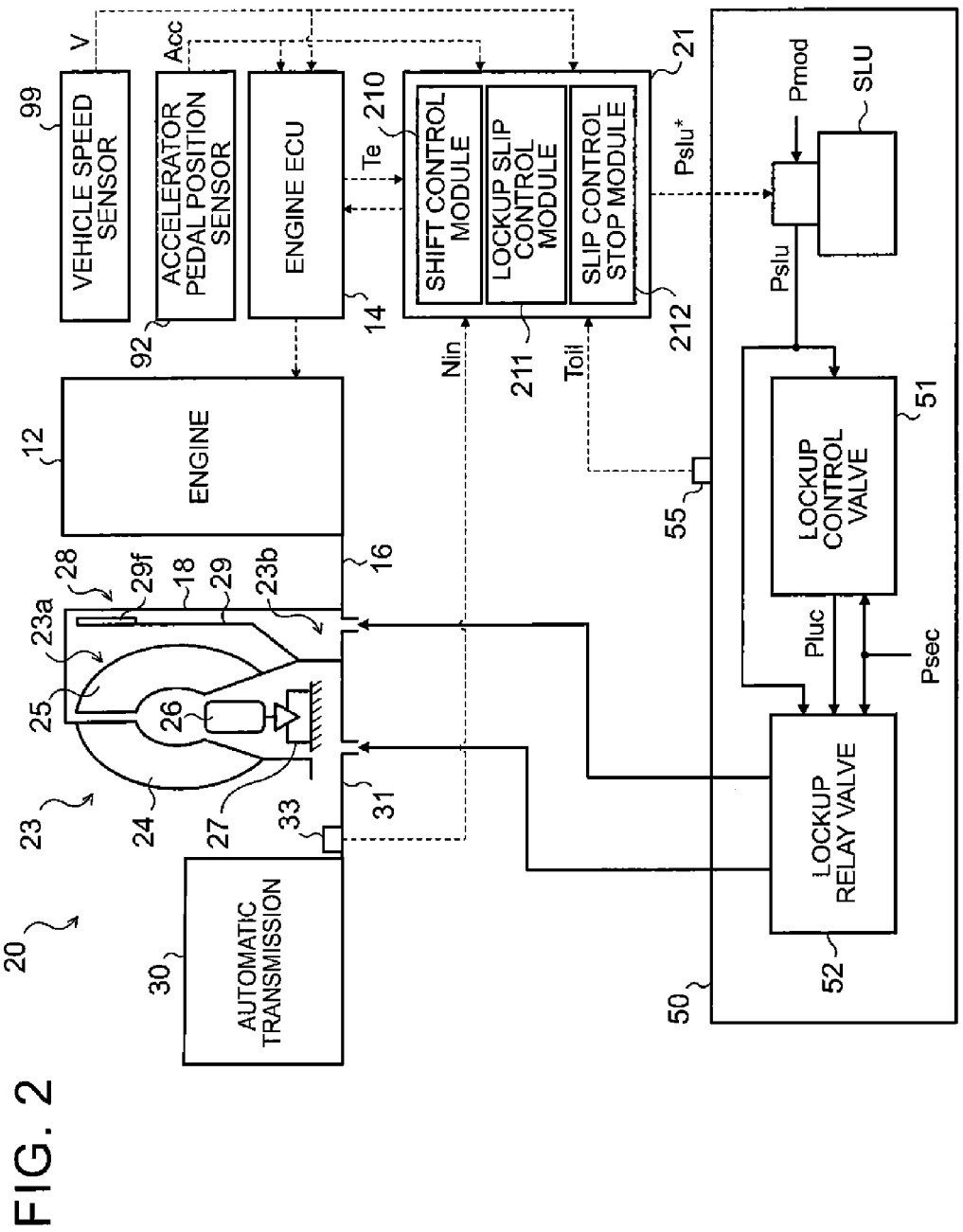
FIG. 2 is a schematic configuration diagram of a power transmission device 20.

The hydraulic transmission device 23 of the power transmission device 20 is configured as a hydraulic torque converter having a lockup clutch 28. As shown in FIG. 2, the hydraulic transmission device 23 includes a pump impeller 24 as an input-side hydraulic transmission element that is connected to a crankshaft 16 of the engine 12 via a front cover 18 as an input member, the turbine runner 25 as an output-side hydraulic transmission element that is fixed to the input shaft 31 of the automatic transmission 30 via a turbine hub, a stator 26 that is placed inside the pump impeller 24 and the turbine runner 25 to adjust the flow of hydraulic oil from the turbine runner 25 to the pump impeller 24, a one-way clutch 27 that limits the rotation direction of the stator 26 to one direction, etc. The hydraulic transmission device 23 functions as a torque amplifier due to the operation of the stator 26 when the rotational speed difference between the pump impeller 24 and the turbine runner 25 is large, and functions as a fluid coupling when this rotational speed difference is small.

The lockup clutch 28 is capable of performing lockup of coupling the pump impeller 24, i.e., the front cover 18 as the input member, and the turbine runner 25 (turbine hub), i.e., the input shaft 31 of the automatic transmission 30, and is capable of cancelling the lockup (full disengagement). If predetermined lockup ON conditions are satisfied after the automobile 10 is started, the pump impeller 24 and the turbine runner 25 are locked (directly coupled) by full engagement of the lockup clutch 28, so that power from the engine 12 is mechanically and directly transmitted to the input shaft 31. The lockup clutch 28 of the embodiment is a single-plate friction clutch including a lockup piston 29 having a friction material (clutch facing) 29f fixed to its surface facing the front cover 18.

The automatic transmission 30 is capable of transmitting power transmitted to the input shaft 31 to an output shaft, not shown, while changing the shift speed to multiple of speeds, and includes a plurality of planetary gear mechanisms, a plurality of clutches, brakes, and one-way clutches that change a power transmission path from the input shaft 31 to the output shaft, etc. The output shaft of the automatic transmission 30 is coupled to the drive wheels DW via a gear mechanism and a differential mechanism which are not shown. The plurality of clutches and brakes are engaged and disengaged by an oil pressure from the hydraulic control device 50.

In order to produce an oil pressure to be applied to the hydraulic transmission device 23 or the automatic transmission 30, the hydraulic control device 50 includes a primary regulator valve that regulates the pressure of hydraulic oil from an oil pump, not shown, to produce a line pressure PL, a secondary regulator valve that regulates, e.g., a drain pressure of the primary regulator valve to produce a secondary pressure Psec, a modulator valve that regulates the line pressure PL to produce a constant modulator pressure Pmod, a solenoid valve that regulates, e.g., the modulator pressure Pmod according to the accelerator operation amount Acc or the opening THR of the throttle valve 13 to produce a signal pressure to be applied to the primary regulator valve, a manual valve that allows the hydraulic oil to be supplied to the plurality of clutches and brakes of the automatic transmission 30 according to the operation position of the shift lever 95, a plurality of linear solenoid valves each capable of regulating the pressure of the hydraulic oil (line pressure PL) from the manual valve to output the regulated pressure to a corresponding clutch or brake, etc. (all of these valves are not shown).

The hydraulic control device 50 further includes a lockup solenoid valve (linear solenoid valve) SLU that regulates the modulator pressure Pmod according to an applied current value to produce a lockup solenoid pressure Pslu, a lockup control valve 51 that regulates the secondary pressure Psec according to the lockup solenoid pressure Pslu from the lockup solenoid valve SLU to produce a lockup clutch pressure Pluc to be applied to the lockup clutch 28, and a lockup relay valve 52 that permits and regulates supply of the lockup clutch pressure Pluc from the lockup control valve 51 to a lockup chamber 23b of the hydraulic transmission device 23 by using the lockup solenoid pressure Pslu from the lockup solenoid valve SLU as a signal pressure.

In the embodiment, the lockup solenoid valve SLU sets the lockup solenoid pressure Pslu to a value of 0 (does not produce the lockup solenoid pressure Pslu) when the applied current value is relatively small. After the applied current value becomes relatively large, the lockup solenoid valve SLU sets the lockup solenoid pressure Pslu to a higher value as the current value increases. When the lockup solenoid pressure Pslu is produced by the lockup solenoid valve SLU, the lockup control valve 51 reduces the secondary pressure Psec as a source pressure more to set the lockup clutch pressure Pluc to a lower value as the lockup solenoid pressure Pslu increases. When the lockup solenoid pressure Pslu is equal to or higher than a predetermined lockup engagement pressure P1, the lockup control valve 51 outputs the lockup clutch pressure Pluc required for full engagement of the lockup clutch 28. Moreover, when the lockup solenoid pressure Pslu is not supplied from the lockup solenoid valve SLU, the lockup relay valve 52 supplies the secondary pressure Psec from the secondary regulator valve to the lockup chamber 23b of the hydraulic transmission device 23. When the lockup solenoid pressure Pslu is supplied from the lockup solenoid valve SLU, the lockup relay valve 52 supplies the secondary pressure Psec from the secondary regulator valve to a hydraulic transmission chamber 23a and supplies the lockup clutch pressure Pluc from the lockup control valve 51 to the lockup chamber 23b.

Accordingly, when the lockup solenoid pressure Pslu is not produced by the lockup solenoid valve SLU, hydraulic oil (secondary pressure Psec) is supplied from the lockup relay valve 52 to the lockup chamber 23b, and the hydraulic oil flows from the lockup chamber 23b into the hydraulic transmission chamber 23a, whereby the pressure in the lockup chamber 23b becomes equal to that in the hydraulic transmission chamber 23a. The lockup clutch 28 is thus disengaged without performing the lockup. Part of the hydraulic oil flowing from the lockup chamber 23b into the hydraulic transmission chamber 23a flows toward the lockup relay valve 52 through a hydraulic oil inlet/outlet port. When the lockup solenoid pressure Pslu produced by the lockup solenoid valve SLU is supplied to the lockup control valve 51 and the lockup relay valve 52, the lockup clutch pressure Pluc (pressure lower than the secondary pressure Psec) produced by the lockup control valve 51 is supplied from the lockup relay valve 52 to the lockup chamber 23b, and the secondary pressure Psec from the secondary regulator valve is supplied from the lockup relay valve 52 to the hydraulic transmission chamber 23a. The lockup piston 29 thus moves so that the lockup clutch 28 is engaged as the pressure in the lockup chamber 23b decreases. When the lockup solenoid pressure Pslu becomes equal to or higher than the lockup engagement pressure P1, the lockup clutch 28 is fully engaged and lockup is completed.

The solenoid valve, the plurality of linear solenoid valves, and the lockup solenoid valve SLU which are included in the hydraulic control device 50 are controlled by the shift ECU 21. In the shift ECU 21, as shown in FIG. 2, hardware such as the CPU, the ROM, and the RAM operates with software such as a control program installed in the ROM to construct a shift control module 210, a lockup slip control module 211, and a slip control stop module 212 as function blocks.

The shift control module 210 obtains a target shift speed corresponding to the accelerator operation amount Acc (or the opening THR of the throttle valve 13) and the vehicle speed V from a predetermined shift diagram, not shown, and sets an engagement pressure command value to be supplied to the linear solenoid valve corresponding to the clutch or brake to be engaged according to a change from a current shift speed to a target shift speed, and a disengagement pressure command value to be supplied to the linear solenoid valve corresponding to the clutch or brake to be disengaged according to the change from the current shift speed to the target shift speed. The shift control module 210 sets a retaining pressure command value to be supplied to the linear solenoid valve corresponding to the engaged clutch or brake while the shift speed is being changed from the current shift speed to the target shift speed or after the target shift speed is achieved.

The lockup slip control module 211 sets an oil pressure command value to be supplied to the lockup solenoid valve SLU, and a current according to the oil pressure command value is applied from an auxiliary battery, not shown, to the lockup solenoid valve SLU. When predetermined slip control execution conditions are satisfied, the lockup slip control module 211 executes slip control to make the rotational speed difference (slip speed) between the front cover 18 as the input member and the input shaft 31 of the automatic transmission 30 match a target slip speed according to the state of the automobile 10 by half engagement of the lockup clutch 28. That is, the lockup slip control module 211 calculates the slip speed, sets a target slip speed according to the state of the automobile 10 based on the shift range SR, an input rotational speed Nin of the automatic transmission 30 which is detected by the rotational speed sensor 33, and the engine torque Te, and controls the lockup solenoid valve SLU etc. so that the slip speed matches the target slip speed. Executing such slip control upon performing the lockup of the lockup clutch 28 can gradually increase the torque capacity of the lockup clutch 28 and suppress generation of vibrations due to torque fluctuations associated with the lockup. Moreover, executing the slip control so as to cause the lockup clutch 28 to slip during acceleration of the automobile 10, upon deceleration of the automobile 10, etc. can improve power transmission efficiency and fuel economy of the engine 12.

The slip control stop module 212 stops the slip control as necessary in order to suppress overheat of the friction material 29f of the lockup piston 29 to protect the lockup clutch 28 while the slip control is being executed by the lockup slip control module 211.

Figure 3:
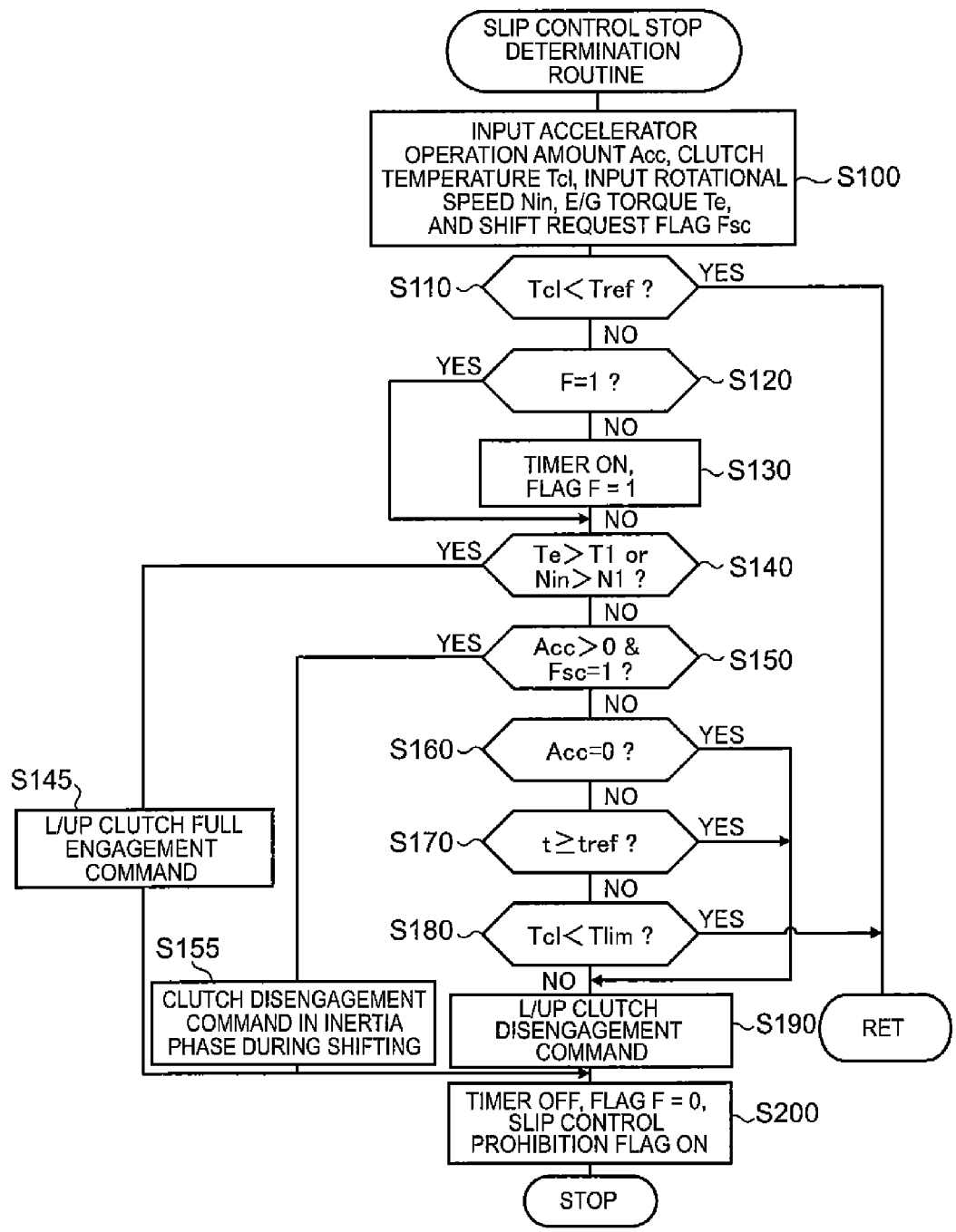
FIG. 3 is a flowchart showing an example of a slip control stop determination routine that is executed by a shift ECU 21.

The procedures for stopping the slip control in the automobile 10 will be described. FIG. 3 is a flowchart showing an example of a slip control stop determination routine that is executed by the slip control stop module 212 of the shift ECU 21. The slip control stop determination routine of FIG. 3 is repeatedly executed at predetermined intervals by the slip control stop module 212 while the slip control is being executed by the lockup slip control module 211.

When the slip control stop determination routine is started, data required for determination, such as the accelerator operation amount Acc from the accelerator pedal position sensor 92, a clutch temperature Tcl, the input rotational speed Nin from the rotational speed sensor 33 as information showing the state of the motor, the engine torque Te from the engine ECU 14, and a shift request flag Fsc are input to the slip control module 212 of the shift ECU 21 (step S100). In the embodiment, the clutch temperature Tcl is an estimate of the surface temperature of the friction material 29f of the lockup piston 29, which is separately calculated by the shift ECU 21 and stored in a predetermined storage region. The clutch temperature Tcl is calculated based on the input rotational speed Nin of the automatic transmission 30, an oil temperature Toil, the rotational speed Ne and the engine torque Te of the engine 12, and the state of the lockup clutch 28 (any of disengaged, being slip controlled, or fully engaged). The shift request flag Fsc is set to a value of 1 when the shift control module 210 determines based on the accelerator operation amount Acc (or the opening THR of the throttle valve 13), the vehicle speed V and the shift diagram that the shift speed of the automatic transmission 30 should be changed, and stored in a predetermined storage region. When the shift speed is to be maintained, the shift request flag Fsc is set to a value of 0 and stored in a predetermined storage region.

After all the required data is input in step S100, the slip control stop module 212 determines if the input clutch temperature Tcl is lower than a predetermined slip control prohibition temperature Tref (predetermined temperature) (step S110). The slip control prohibition temperature Tref is the surface temperature of the friction material 29f at the time the slip control should be prohibited in order to suppress overheat of the friction material 29f to protect the lockup clutch 28, and is determined in advance by experiment and analysis. If the clutch temperature Tcl is lower than the slip control prohibition temperature Tref (step S110: YES), the slip control stop module 212 terminates the routine without performing the processing of the steps subsequent to step S110, and resumes the routine at the following execution timing.

Figure 4:
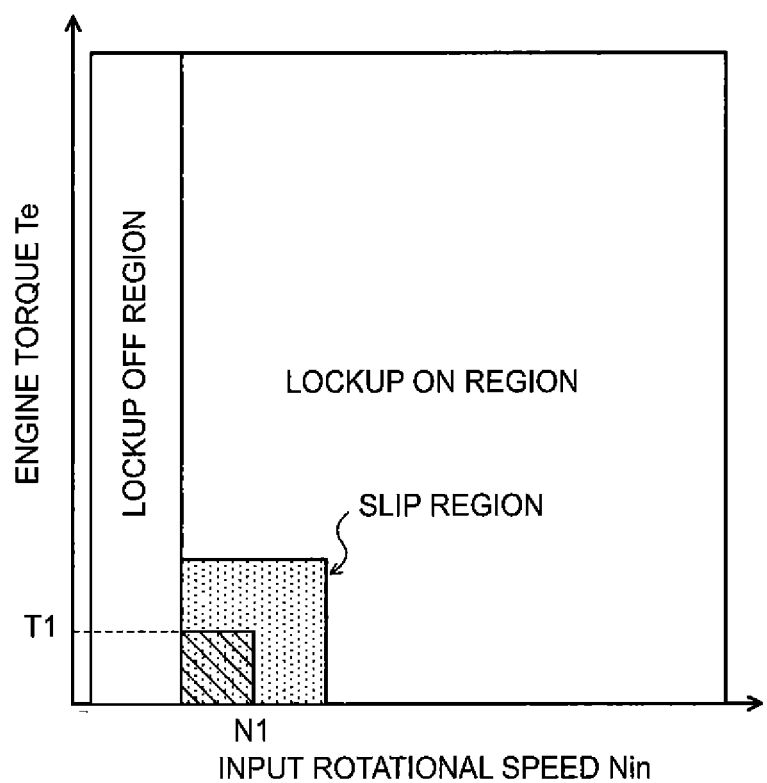
FIG. 4 is an illustration showing a lockup OFF region, a slip region, and a lockup ON region of a lockup clutch 28.

If the clutch temperature Tcl is equal to or higher than the slip control prohibition temperature Tref and the lockup clutch 28 should be protected (step S110: NO), the slip control stop module 212 determines if a predetermined flag F has a value of 1 (step S120). If the flag F has a value of 0 (step S120: NO), the slip control stop module 212 turns on a timer, not shown, and sets the flag F to a value of 1 (step S130). The processing of step S130 is skipped if it is determined that the flag F has a value of 1 (step S120: YES). The slip control stop module 212 then determines if the engine torque Te input in step S100, namely the input torque that is transferred from the engine 12 to the front cover 18 as the input member, is larger than predetermined torque T1 or if the input rotational speed Nin is higher than a predetermined rotational speed N1 (step S140). As shown in FIG. 4, the predetermined torque T1 is a torque value that falls within the range of the engine torque Te which defines a predetermined slip region of the lockup clutch 28, and the predetermined rotational speed Ni is a rotational speed that falls within the range of the input rotational speed Nin which defines the slip region.

If the engine torque Te is larger than the predetermined torque T1 or the input rotational speed Nin is higher than the predetermined rotational speed N1 (step S140: YES), the slip control stop module 212 sends a lockup clutch full engagement command to the lockup slip control module 211 so that the lockup clutch 28 is fully engaged (step S145), turns off the timer, sets the flag F to a value of 0, and sets a slip control prohibition flag to on (step S200), and terminates the routine. In response to the lockup full engagement command, the lockup slip control module 211 controls the lockup solenoid valve SLU so that the lockup clutch 28 is fully engaged to perform lockup.

As described above, in the embodiment, if the clutch temperature Tcl is equal to or higher than the slip control prohibition temperature Tref, and if the engine torque Te is larger than the predetermined torque T1 or the input rotational speed Nin is higher than the predetermined rotational speed N1, the lockup clutch 28 is fully engaged (lockup ON) to stop the slip control. When the slip control prohibition flag is set to on, the lockup slip control module 211 is prohibited from executing the slip control. If NO in step S140, the lockup clutch 28 is disengaged (lockup OFF) to stop the slip control, as described below.

If the engine torque Te is equal to or smaller than the predetermined torque T1 and the input rotational speed Nin is equal to or lower than the predetermined rotational speed N1 (step S140: NO), the slip control stop module 212 determines if the accelerator operation amount Acc input in step S100 is larger than a value of 0 and if the shift request flag Fsc has a value of 1 (step S150). If the accelerator operation amount Acc is larger than a value of 0 and thus the automobile 10 is in a power ON state where there is a torque request to the engine 12 made by the driver, and if the shift request flag Fsc has a value of 1 and thus there is a request to change the shift speed (step S150: YES), the slip control stop module 212 sends an inertia phase clutch disengagement command to the lockup slip control module 211 so that the lockup clutch 28 is disengaged in an inertia phase during changing of the shift speed (step S155), turns off the timer, sets the flag F to a value of 0, and sets the slip control prohibition flag to on (step S200), and terminates the routine. In response to the inertia phase clutch disengagement command, the lockup slip control module 211 starts control to disengage the lockup clutch 28 when the inertia phase starts during changing of the shift speed.

If the accelerator operation amount Acc is not larger than a value of 0 or if the shift request flag Fsc has a value of 0 (step S150: NO), the slip control stop module 212 determines if the accelerator operation amount Acc input in step S100 has a value of 0 (step S160). If the accelerator operation amount Acc has a value of 0 and thus the automobile 10 is in a power OFF state where there is no torque request to the engine 12 made by the driver (step S160: YES), the slip control stop module 212 sends a lockup clutch disengagement command to the lockup slip control module 211 so that the lockup clutch 28 is disengaged (step S190), turns off the timer, sets the flag F to a value of 0, and sets the slip control prohibition flag to on (step S200), and terminates the routine. In response to the lockup clutch disengagement command, the lockup slip control module 211 immediately starts control to disengage the lockup clutch 28.

Moreover, if it is determined that the accelerator operation amount Acc does not have a value of 0 (step S160: NO), the slip control stop module 212 determines if the time t measured by the timer is equal or greater than a predetermined time tref (step S170). The predetermined time tref is determined in advance by experiment and analysis based on allowable duration of the state where the clutch temperature Tcl is equal to or higher than the slip control prohibition temperature Tref. If the measured time t is equal to or greater than the predetermined time tref (step S170: YES), the slip control stop module 212 sends a lockup clutch disengagement command to the lockup slip control module 211 so that the lockup clutch 28 is disengaged (step S190), turns off the timer, sets the flag F to a value of 0, and sets the slip control prohibition flag to on (step S200), and terminates the routine. In response to the lockup clutch disengagement command, the lockup slip control module 211 immediately starts control to disengage the lockup clutch 28.

If it is determined that the time t measured by the timer is less than the predetermined time tref (step S170: NO), the slip control stop module 212 determines if the clutch temperature Tcl input in step S100 is higher than an upper limit temperature Tlim which is higher than the slip control prohibition temperature Tref (step S180). If the clutch temperature Tcl is higher than the upper limit temperature Tlim (step S180: YES), the slip control stop module 212 sends a lockup clutch disengagement command to the lockup slip control module 211 so that the lockup clutch 28 is disengaged (step S190), turns off the timer, sets the flag F to a value of 0, and sets the slip control prohibition flag to on (step S200), and terminates the routine. In response to the lockup clutch disengagement command, the lockup slip control module 221 immediately starts control to disengage the lockup clutch 28.

If it is determined in step S180 that the clutch temperature Tcl is equal to or lower than the upper limit temperature Tlim (step S180: NO), the slip control stop module 212 determines that the automobile 10 is not in the state suitable for stopping the slip control, and terminates the routine. The slip control stop module 212 resumes the routine at the following execution timing. The slip control prohibition flag set to on in step S200 is set to off when the clutch temperature Tcl becomes equal to or lower than a slip control prohibition cancel temperature lower than the slip control prohibition temperature Tref, whereby the lockup slip control module 211 is allowed to execute the slip control.

As described above, if the clutch temperature Tcl is equal to or higher than the slip control prohibition temperature Tref during execution of slip control by the lockup slip control module 211, the slip control stop module 212 of the shift ECU 21 stops the slip control by fully engaging or disengaging the lockup clutch 28 according to the engine torque Te that is transferred from the engine 12 to the front cover 18 as the input member and the input rotational speed Nin of the automatic transmission 30. Thus, when the slip control is stopped to protect the lockup clutch 28, one of full engagement and disengagement of the lockup clutch 28 which can more satisfactorily suppress manifestation of rotation fluctuations of the engine 12 etc., change in noise of the engine 12 or running noise, vibrations of the automobile 10 or the engine 12, etc. can be selected according to the running state of the automobile 10. This can reduce the possibility of making an occupant of the automobile 10 feel uncomfortable by stopping of the slip control. Specifically, if both the engine torque Te and the input rotational speed Nin are low, vibrations of the engine 12 are large, and therefore this advantage can be satisfactorily obtained by disengaging the lockup clutch 28. Accordingly, in the automobile 10, the slip control can be more properly stopped to protect the lockup clutch 28.

In step S140 of FIG. 3, whether the rotational speed Ne of the engine 12 from the engine ECU 14 is higher than a predetermined rotational speed or not may be determined instead of determining whether the input rotational speed Nin is higher than the predetermined rotational speed N1 or not. That is, it may be determined that the lockup clutch 28 should be fully engaged if the rotational speed Ne of the engine 12 is input from the engine ECU 14 in step S100 and the engine torque Te is larger than the predetermined torque T1 or the rotational speed Ne of the engine 12 is higher than the predetermined rotational speed, and the lockup clutch 28 may be allowed to be disengaged if the engine torque Te is equal to or smaller than the predetermined torque T1 and the rotational speed Ne is equal to or lower than the predetermined rotational speed. Whether the lockup clutch 28 should be fully engaged or disengaged can thus be more properly determined. When the slip control is stopped to protect the lockup clutch, one of full engagement and disengagement of the lockup clutch 28 which can more satisfactorily suppress manifestation of rotation fluctuations, change in noise, vibrations, etc. of the engine 12 can be selected according to the state of the engine 12. In step S140, only the engine torque Te and the predetermined torque T1 may be compared, or only the rotational speed Nin or Ne and the predetermined rotational speed (N1) may be compared.

The slip control stop module 212 of the shift ECU 21 fully engages the lockup clutch 28 to stop the slip control if the engine torque Te is larger than the predetermined torque T1 or the input rotational speed Nin is higher than the predetermined rotational speed N1 (steps S140, S145), and disengages the lockup clutch 28 to stop the slip control if the engine torque Te is equal to or smaller than the predetermined torque T1 and the input rotational speed Nin is equal to or lower than the predetermined rotational speed N1 (steps S150 to S190). Thus, when the lockup clutch 28 should be protected, the slip control can be stopped by performing more preferable one of full engagement and disengagement of the lockup clutch 28.

Moreover, when stopping the slip control by disengaging the lockup clutch 28, the slip control stop module 212 of the shift ECU 21 disengages the lockup clutch 28 in an inertia phase of shifting if there are a torque request to the engine 12 and a request for the shifting of the automatic transmission 30 (steps S150, S155). That is, in the inertia phase of the shifting, rotation of the engine 12 or the input shaft 31 of the automatic transmission 30 fluctuates regardless of the engagement state of the lockup clutch 28. Accordingly, disengaging the lockup clutch 28 in the inertia phase can suppress manifestation of rotation fluctuations, change in noise, vibrations, etc. which are associated with the disengagement of the lockup clutch 28.

When stopping the slip control by disengaging the lockup clutch 28, the slip control stop module 212 of the shift ECU 21 immediately disengages the lockup clutch 28 if there is no torque request to the engine 12 (steps S160 and S190). That is, if there is no torque request to the engine 12, the rotational speed of the engine 12 or the input shaft 31 of the automatic transmission 30 decreases, and manifestation of rotation fluctuations, change in noise, vibrations, etc. which are associated with the disengagement of the lockup clutch 28 is therefore less likely to occur. Immediately disengaging the lockup clutch 28 can thus satisfactorily protect the lockup clutch 28.

Although the lockup clutch 28 of the embodiment is configured as a single-plate friction clutch, the lockup clutch 28 may be configured as a multi-plate friction clutch. Although the lockup clutch 28 is included in the hydraulic transmission device 23, the present invention is also applicable to an independent lockup clutch that is not combined with a fluid coupling, a torque converter, etc. or a lockup clutch that is combined only with a damper device. In steps S150 and S160 of FIG. 3, whether there is a torque request to the engine 12 or not is determined based on the accelerator operation amount Acc. However, in steps S150 and S160, whether there is a torque request to the engine 12 or not may be determined based on the throttle opening THR of the throttle valve 13 or the request torque to the engine 12 which is set based on the accelerator operation amount Acc and the vehicle speed V or the throttle opening THR, instead of being determined based on the accelerator operation amount Acc. The clutch temperature Tcl may be a temperature other than the surface temperature of the friction material 29f such as, an oil temperature in the lockup chamber 23b, as long as the lockup clutch 28 can be protected.

Correspondence between the primary elements of the embodiment and the primary elements of the invention described in "SUMMARY OF THE INVENTION" will be described. In the embodiment, the lockup clutch 28 capable of coupling the front cover 18 connected to the engine 12 of the automobile 10 and the input shaft 31 of the automatic transmission 30 and decoupling the front cover 18 and the input shaft 31 corresponds to the "lockup clutch." The lockup slip control module 211 that executes the slip control to make the rotational speed difference between the front cover 18 and the input shaft 31 match a target slip speed according to the state of the automobile 10 by half engagement of the lockup clutch 28 corresponds to the "slip control means." The shift ECU 21 that calculates the clutch temperature Tcl of the lockup clutch 28 corresponds to the "clutch temperature obtaining means." The slip control stop module 212 that stops slip control by fully engaging or disengaging the lockup clutch 28 according to the engine torque Te that is transferred from the engine 12 to the front cover 18 and the input rotational speed Nin if the clutch temperature Tcl becomes equal to or higher than the slip control prohibition temperature Tref during execution of the slip control corresponds to the "slip control stop means."

The correspondence between the primary elements of the embodiment and the primary elements of the invention described in "SUMMARY OF THE INVENTION" is shown by way of example to specifically describe the mode in which the embodiment carries out the invention described in "SUMMARY OF THE INVENTION." This correspondence is therefore not intended to limit the elements of the invention described in "SUMMARY OF THE INVENTION." That is, the embodiment is merely a specific example of the invention described in "SUMMARY OF THE INVENTION," and the invention described in "SUMMARY OF THE INVENTION" should be construed based on the description therein.

Although the mode for carrying out the invention is described above based on the embodiment, it should be understood that the present invention is not limited in any way to the above embodiment, and various modifications can be made without departing from the spirit and scope of the present invention.

INDUSTRIAL APPLICABILITY

The present invention is applicable in the manufacture industry of lock-up clutches, etc.

The invention claimed is:

1. A control device for a lockup clutch capable of coupling an input member connected to a motor of a vehicle and an input shaft of a transmission device and decoupling the input member and the input shaft, comprising:
    slip control means for executing slip control to make a rotational speed difference between the input member and the input shaft match a target slip speed according to a state of the vehicle by half engagement of the lockup clutch;
    clutch temperature obtaining means for obtaining a clutch temperature of the lockup clutch;
    determining means for determining if the lockup clutch should be fully engaged or disengaged based on at least a state of the motor if the clutch temperature becomes equal to or higher than a predetermined temperature during execution of the slip control,
    wherein the determining means determines that the lockup clutch should be fully engaged if an input torque that is transferred from the motor to the input member is larger than a predetermined torque or a rotational speed of the motor is higher than a predetermined rotational speed, and determines that the lockup clutch should be disengaged if the input torque is equal to or smaller than the predetermined torque and the rotational speed of the motor is equal to or lower than the predetermined rotational speed; and
    slip control stop means for stopping the slip control by fully engaging or disengaging the lockup clutch according to the determination result of the determining means.

2. The control device for the lockup clutch according to claim 1, wherein
    the slip control stop means stops the slip control by disengaging the lockup clutch in an inertia phase of shifting, if there are a torque request to the motor and a request for the shifting of the transmission device.

3. The control device for the lockup clutch according to claim 1, wherein
    the slip control stop means stops the slip control by immediately disengaging the lockup clutch, if there is no torque request to the motor.

4. A control method for a lockup clutch capable of coupling an input member connected to a motor of a vehicle and an input shaft of a transmission device and decoupling the input member and the input shaft, comprising the steps of:
- (a) executing slip control to make a rotational speed difference between the input member and the input shaft match a target slip speed according to a state of the vehicle by half engagement of the lockup clutch;
- (b) determining if the lockup clutch should be fully engaged or disengaged based on at least a state of the motor if a clutch temperature becomes equal to or higher than a predetermined temperature during execution of the slip control, wherein it is determined that the lockup clutch should be fully engaged if an input torque that is transferred from the motor to the input member is larger than a predetermined torque or a rotational speed of the motor is higher than a predetermined rotational speed, and it is determined that the lockup clutch should be disengaged if the input torque is equal to or smaller than the predetermined torque and the rotational speed of the motor is equal to or lower than the predetermined rotational speed; and
- (c) stopping the slip control by fully engaging or disengaging the lockup clutch according to the determination result in step (b).

\* \* \* \* \*